(12) United States Patent
Ng

(10) Patent No.: US 7,472,511 B1
(45) Date of Patent: Jan. 6, 2009

(54) INSECT TRAP

(76) Inventor: Kim Kwee Ng, 10 Malibu Ln, Centereach, NY (US) 11720-3042

( * ) Notice: Subject to any disclaimer, the term of this patent is extended or adjusted under 35 U.S.C. 154(b) by 0 days.

(21) Appl. No.: 10/708,626

(22) Filed: Mar. 16, 2004

(51) Int. Cl.
  *A01M 23/00* (2006.01)
(52) U.S. Cl. .................................. 43/65; 43/107; 43/121
(58) Field of Classification Search .................. 43/65, 43/107, 121, 113, 114, 122, 66, 67
  See application file for complete search history.

(56) References Cited

U.S. PATENT DOCUMENTS

| 1,209,993 | A | * | 2/1916 | Oettinger | 43/121 |
| 1,655,361 | A | * | 1/1928 | Deverow | 43/65 |
| 3,996,690 | A | * | 12/1976 | Ridings | 43/65 |
| 4,244,135 | A | * | 1/1981 | Harwoods | 43/122 |
| 5,239,771 | A | | 8/1993 | Beardsley | 43/119 |
| 5,896,695 | A | * | 4/1999 | Walker | 43/107 |
| 6,158,165 | A | * | 12/2000 | Wilson | 43/66 |
| 6,910,298 | B2 | * | 6/2005 | Schneidmiller | 43/65 |

* cited by examiner

*Primary Examiner*—Kimberly S. Smith

(57) ABSTRACT

An insect trap comprises a crawl path made of a plurality of resilient deflectable strips. An enclosure enclosing the crawl path comprises an inner passageway leading from an aperture through which the insect enters to a confined chamber. The exit of the passageway is normally closed until the crawl path deflects to allow the insect to exit. The insect is lured by an insect attractant placed inside the chamber and alights on the crawl path. The crawl path deflects downwardly to reveal an opening for the insect to depart from the crawl path into the confined chamber. The crawl path returns to its closed position upon the departure of the insect from the deflected strips.

18 Claims, 3 Drawing Sheets

INSECT TRAP

BACKGROUND OF INVENTION

1. Field of the Invention

The invention relates to an insect trap for trapping flies and flying insects for collection and subsequent disposal.

2. Description of the Prior Art

Many insect traps have relied on the use of baffles, baits, insecticides, sticky disposable trap and the like to trap and kill flies. U.S. Pat. No. 5,239,771 of Beardsley has proposed a trap having a plurality of baffles to guide flies through an aperture into a housing body. Many entry chambers, passageways are provided in the housing body, the flies are eventually led to a storage chamber. A hood obscures the exit from the storage chamber. A transparent back has inclined portions to discourage fly exit.

Other methods for controlling the insects include spraying of insecticides, use of poisonous bait and the like. Use of the insecticides is often dissatisfactory, it is not only polluting the environment, producing annoying smell, but has also often given rise to a new generation of insects having developed antibodies to the toxic chemicals used in the spray or baits.

SUMMARY OF INVENTION

An insect trap comprises a plurality of resilient deflectable strips which are grouped together as a bunch to form an enclosed tapered empty passageway within the bunch. The passageway comprises a crawl path which starts from an aperture where an insect enters to a closed place at the distal ends of the deflectable strips.

The insect is lured by an insect attractant placed inside a confined chamber. The insect enters the aperture and lands on the crawl path which is usually composed of one or more of the deflectable strips in the bunch. The deflectable strips onto which the insect has landed are deflected downwardly and disjoint from the bunch to reveal an opening into the interior of the chamber. The insect departs from the bunch into the confined chamber. The deflected strips deflects upwardly to return to its original, undisturbed position as other members of the deflectable strips in the bunch.

A slidable tray with a removable transparent cross-wired mesh cover contains an insect attractant to attract the insect. Food attractant, which is placed adjacent to sticky material inside a removable cartridge, lures the hungry insect into the cartridge. Other preferable configurations of the bunch in various forms are also shown and discussed.

Another preferred embodiment comprises a plurality of deflectable strips in a cylindrical housing containing an electrical bulb to attract a fly. A collection chamber is provided to collect the dead flies from the insect trap.

It is an object of the present invention to provide an insect trap for trapping insects without the use of poisonous baits.

It is an object of the present invention to provide a new and improved device which is relatively simple in construction and inexpensive to manufacture.

These and other objects of the present invention will become apparent from the accompanying drawings and following detailed description of the invention.

DETAILED DESCRIPTION

A more complete understanding of my invention may be obtained through the study of this description when taken together with the appended drawings, wherein like reference symbols refer to like elements of the drawings.

Figure 1:
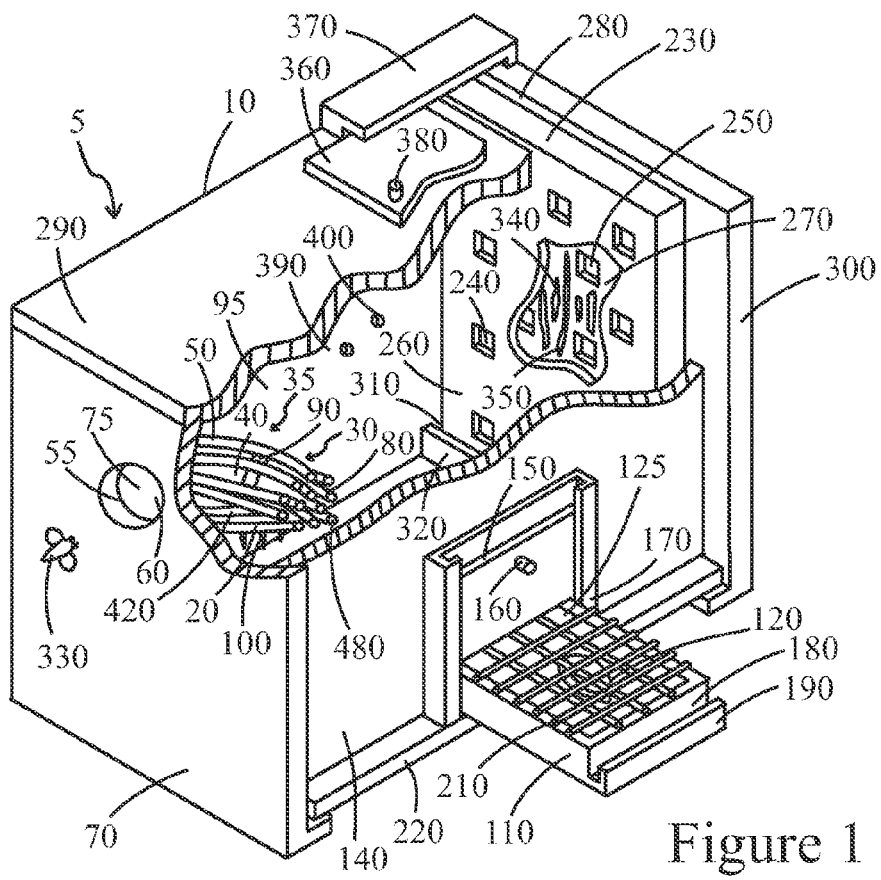
FIG. 1 is a simplified diagram of a first preferred embodiment showing a chamber with an exposed section revealing the inner structure of the chamber.

Referring now to the first preferred embodiment of my invention shown in FIG. 1, wherein an insect trap 5 having a hollow chamber 10 for trapping a flying insect like houseflies, mosquitos and the like, comprises a plurality of sufficiently long, resilient and deflectable strips 20 which are bundled as a bunch 30 to form a tapered passageway 40. In the first preferred configuration of the bunch 30, the terminal end 50 of the bunch 30 is dispersed and terminated around the periphery 55 of a through opening, which is an aperture 60 on a side wall 70 of the chamber 10. The bunch 30 is converged and closed at the opposite distal end 80, creating a long and clear, spacious un-impeded hallway which is the tapered passageway 40 in which the insect could move forward. The deflectable strip 20 is preferably made of a flexible resilient fiber, thin and flexible metal strip or the like.

In the upper half of the bunch 30, the deflectable strips 20 forming the outermost layer of the bunch 30 are linked together by a plurality of short flexible strips 90. The bunch 30 effectively forms a bottomless impenetrable enclosure 35 having only one open-ended side opening 75 adjacent to the aperture 60. The bunch 30 cooperates with a crawl path 420 to form a closed enclosure with an entrance at the aperture 60. The crawl path 420 acts as a collapsible bottom floor which is in direct and close proximity to the interior 95 of the chamber 10 of trap 5. The crawl path 420 serves as a path to lead an insect 330 to move from the aperture 60 and collapses at a far distal free end 480 of the path into the interior 95 of the chamber 10. In the lower half of the bunch 30, a plurality of sharp tines 100 mounted to some of the deflectable strips 20 is pointing outwardly from the bunch 30 to deter the flies from attaching themselves to the deflectable strips 20.

A slidable tray 110 containing an insect attractant 120 or a freshly prepared meat is inserted into the chamber 10 through a through opening 125 on the front wall 140 of the chamber 10. A board 150 having a knob 160 is slidable between a pair of opposing guard rails 170. The tray 110 comprises a longitude channel or a slot 180 formed by a raised wall 190 extending from the front wall 200 of the tray 110. The board 150 is lowered into the slot 180 after the tray 110 has been pushed into the chamber 10. The board 150 engages the tray 110 and prevents the tray 110 from further movement. A transparent cross-wired mesh removable cover 210, comprising an array of closely spaced crossed wires, is used to cover the tray 110. The cross-wired mesh cover 210 prevents the flies from eating the insect attractant 120. The tray 110 rests on a removable bottom plate 220 of the chamber 10, to allow easy maintenance and cleaning of the chamber 10.

The tray 110 can be withdrawn from the chamber 10 and the board 150 is lowered to engage the bottom plate 220 of chamber 10. The whole chamber 10 can be immersed in a bucket of water, drowning the flies contained therein. Alternatively, the cross-wired mesh cover 210 can be inserted to cover the top of the tray 110, the flies are denied direct access of the food to survive. The flies would die of hunger or dehydration.

Another approach for collection of the flies is to use a disposable cartridge. The chamber 10 comprises a disposable hollow cartridge 230. The cartridge 230 is preferably a hollow rectangular box, which is generally made of thin paper cardboards and the like. The cartridge 230 includes a plurality of rectangular cut-out sections 240, 250 on the front side 260 and the bottom 270 of the cartridge 230. The cartridge 230 is inserted vertically into the chamber 10 through an opening 280 on the top wall 290 of chamber 10, with the bottom end 270 touching the side wall 300, which is preferably made of a translucent or transparent material.

The cartridge 230 is lowered to engage a slot 310 formed by a raised wall 320 on the bottom 220 of the chamber 10. The front cut-out sections 240 on the front side 260 of the cartridge 230 are displaced with respect to the location of the rear cut-out sections 250 on the bottom 270 of the cartridge 230. The light penetrates the side wall 300 of chamber 10 and enters the cartridge 230 through the rear cut-out sections 250 on the bottom 270 of the cartridge 230. The light is diffused inside the cartridge 230. A fly 330 attracted by the light and the insect attractant 340 placed inside the cartridge 230 enters the cartridge 230 through one of the front cut-out sections 240 on the front side 260 of the cartridge 230.

The fly 330 is hungry if the tray 110 is withdrawn from the chamber 10 or covered by the cross-wired mesh cover 210. The fly 330 would tend to move toward the insect attractant 340 inside the cartridge 230. Discrete segments of adhesive, sticky material 350 and insect attractants 340 are placed alternately and adjacent to each other on the bottom 270 of the cartridge 230. The fly 330 would get trapped by the sticky material placed inside the cartridge 230.

To remove the disposable cartridge 230, a board 360 which is constrained between a pair of guard rails 370 is slid by pushing a knob 380 away from the side wall 300. The cartridge 230 is exposed for replacement. Two thin cardboards (not shown) having preferably the same dimension as the front side 260 of the cartridge 230 are inserted vertically into the chamber 10. These two thin cardboards cover respectively the front side 260 and the bottom 270 of the cartridge 230. The cartridge 230 and these cardboards are pulled out together from the chamber 10. A new disposable cartridge 230 can be inserted into the chamber 10.

The wall 390 of the chamber 10 comprises an array of small orifices 400 for venting.

Figure 2:
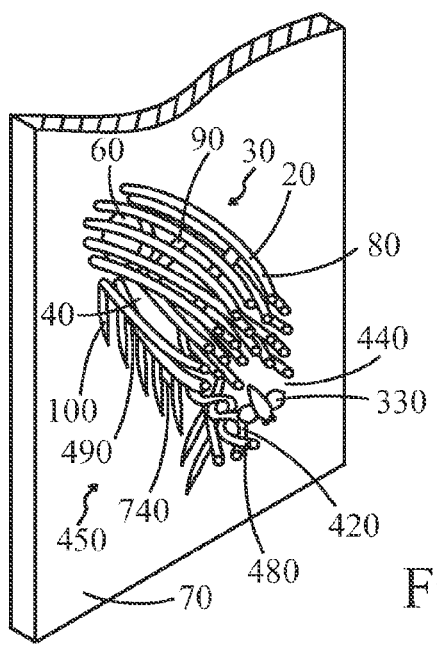
FIG. 2 is a simplified diagram of a first preferred configuration of a bunch in the first preferred embodiment comprising a plurality of deflectable strips mounted to one of the walls of the chamber in FIG. 1.

Referring now to FIG. 2, wherein the first preferred configuration of the bunch 30 employed in FIG. 1 is shown in detail. A plurality of deflectable strips 20 constituting the bunch 30 is mounted to the side wall 70 of the chamber 10 of FIG. 1, the fly 330 attracted by an insect attractant 120, for example, a freshly prepared meat, or scent produced by a scent attractant placed in the tray 110 of FIG. 1, alights on the crawl path 420 through the aperture 60. The crawl path 420 is formed by a first set of the deflectable strips 20 which are twisted together to allow the fly 330 to crawl. The crawl path 420 is sufficiently long for the fly 330 to crawl and bend downwardly. The fly 330 crawls along the crawl path 420 inside the passageway 40. The surface of the crawl path 420 is preferably rough enough to provide sufficient traction for the fly 330 to crawl.

When the fly 330 lands on the crawl path 420, the first set of the deflectable strips 20 constituting the crawl path 420 is deflected downwardly and disjoint from other deflectable strips 20 in the bunch 30, thereby creating an opening 440 to the interior of the chamber 10 at the distal end 80 of the bunch 30. The size of the opening 440 increases as the fly 330 moves toward the distal ends 480 of the deflected strips 20.

The fly 330 is able to begin to fly or crawl toward the distal end 480 of the crawl path 420 and departs finally from the deflected strips 20 into the chamber 10 of FIG. 1. The deflected strips 20 constituting the crawl path 420 are deflected back upwardly upon the departure of the fly 330 into the chamber 10. The crawl path 420 is closed at the distal end 80 of the bunch 30 when the deflected strips 20 return to their initial closed position with other members of the deflectable strips 20 in the bunch 30.

An enclosure 450 comprising a second set of the deflectable strips 20 is employed to surround the crawl path 420. The enclosure 450 is configured to form the inner tapered passageway 40. The tapered passageway 40 which leads from the aperture 60 is decreasing in size in the cross-sectional area in a direction from the aperture 60 to the distal end 80 of the bunch 30. The crawl path 420 is closed at the distal end 80 of the bunch 30, as the enclosure 450 converges finally at the distal end 80 of the bunch 30. The distal end 480 of the crawl path 420 changes from a closed position to an open position to reveal an opening 440 leading into the chamber 10 when the fly 330 lands on the crawl path 420, and the strips 20 constituting the crawl path 420 are deflected downwardly. The crawl path 420 is closed to the fly confined to the interior of chamber 10 when the fly 330 departs and the deflected strips 20 restore to their original configuration.

The number of deflectable strips 20 is preferably sufficiently large to provide several layers of protection and serve as a protective cover enclosing the passageway 40 to deter the flies from squeezing themselves into the passageway 40 and escape from the trap 5 of FIG. 1.

The strips 20 in the outermost layer and the upper part of the bunch 30 are linked together by a plurality of short flexible strips 90, restricting the ability of the fly 330 to penetrate the bunch 30. The lower part of the bunch 30 is populated with a plurality of tines 100 mounted onto the underside surface 490 of the bunch 30.

Figure 3:
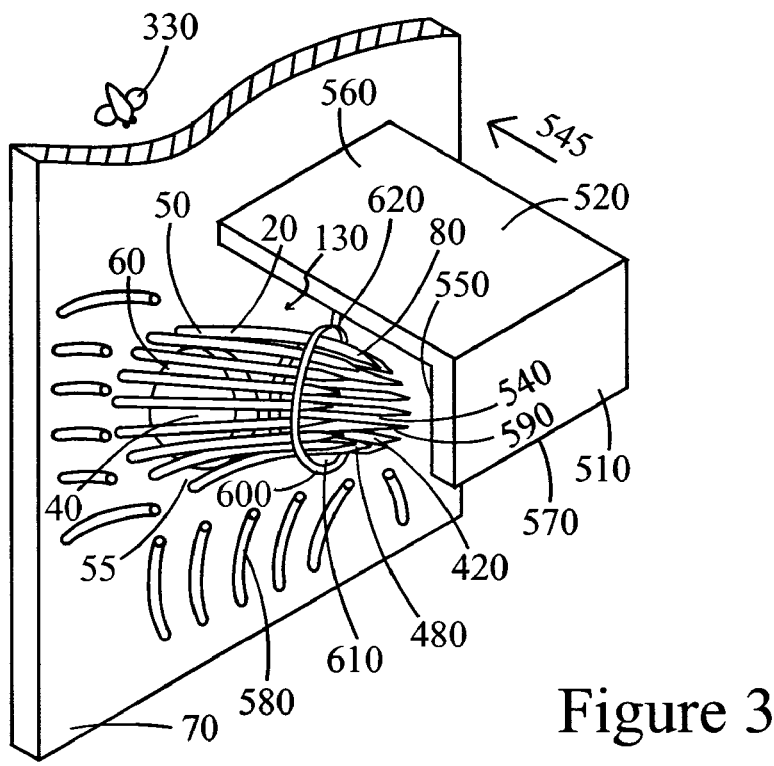
FIG. 3 is a simplified diagram of a second preferred configuration of the bunch comprising a plurality of deflectable strips.

Referring now to FIG. 3, the second preferred configuration of the bunch 30 is a tapered bunch 130 comprising a plurality of deflectable strips 20 grouped to form an open-ended tapered passageway for use in the chamber 10 in FIG. 1. The distal end 480 of the crawl path 420 is covered by an enclosure made up of a transparent wall 510 supported by a supporting arm 520. The terminal end portion 50 of the tapered bunch 130 is terminated in the region around the periphery 55 of the aperture 60, the tapered bunch 130 converges therefrom to the opposite distal end 80, creating an enclosed converging tapered passageway 40. The cross sectional area of the passageway 40 decreases in size, as measured in a direction from the aperture 60 to the distal end 80 of the tapered bunch 130. The passageway 40 comprises the crawl path 420 for an insect to land and crawl. The tapered bunch 130 terminates with a small opening 540 at the distal end 80 of the tapered bunch 130. The size of the opening 540 is sufficiently big enough to allow the fly 330 to exit. The wall 510 and the supporting arm 520 are displaced in FIG. 3 in order to show the clarity of the structure of the tapered bunch 130.

The wall 510 and the supporting arm 520 are moved in a direction shown by an arrow 545 so that the inner wall surface 550 of the wall 510 covers the opening 540 completely. The terminal end 560 of the supporting arm 520 is mounted to the wall 70 of FIG. 1.

When the fly 330 enters the passageway 40 through the aperture 60, the tapered bunch 130 deflects downwardly to reveal a small opening below the bottom edge 570 of the wall 510. The distal end 80 of the tapered bunch 130 continues to descend as the fly 330 crawls toward the opening 540. The fly 330 reaches the distal end 80 of the tapered bunch 130 and the distal end 80 of the tapered bunch 130 comprising the opening 540 descends below the bottom edge 570 of the wall 510 for the fly 330 to leave and enter the chamber 10 of FIG. 1.

The tapered bunch 130 is further surrounded by a ring of enclosure 580 comprising a plurality of deflectable strips 20. The enclosure 580 prevents other flies trapped in the chamber 10 of FIG. 1 from reaching the tapered bunch 130. The distal end 80 of each one of the deflectable strips 20 is shaped like a tine 590 to deter the flies trapped in the chamber 10 of FIG. 1 from squeezing themselves into the passageway 40. To prevent overswinging of the deflectable strips 20, one end of a string 600 is wrapped around the end portion 80 of the tapered bunch 130 to form a loose closed loop 610, the other loose end 620 of the string 600 is mounted to the supporting arm 520.

Figure 4:
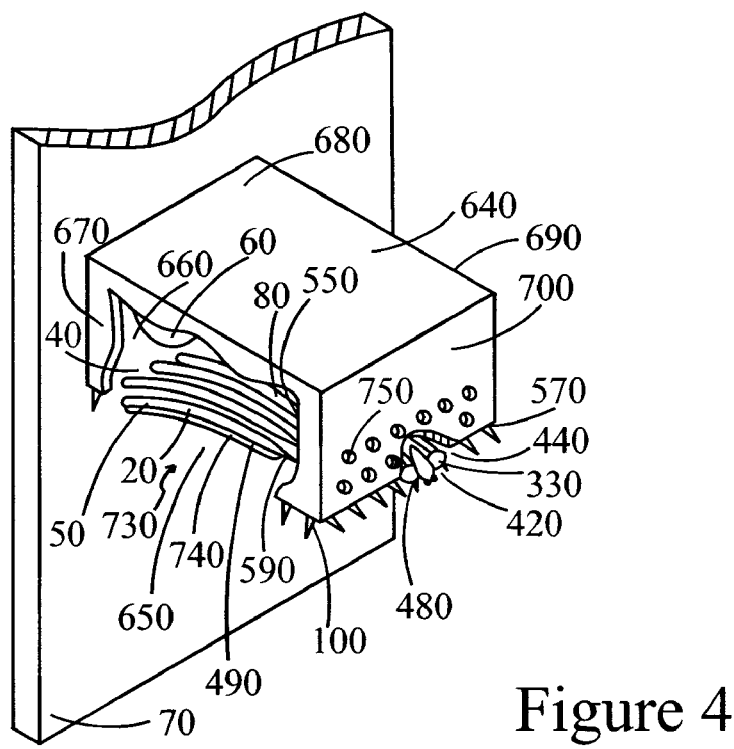
FIG. 4 is a simplified diagram of a third preferred configuration of the bunch comprising a plurality of deflectable strips.

FIG. 4 shows the third preferred configuration of the bunch 30 for use in the chamber 10 of FIG. 1. A bottomless enclosure 640 with an open bottom end 650 and an open rear end 660 encompassing the aperture 60 comprises walls, 670, 680, 690 and a front wall 700. A plurality of deflectable strips 20 having terminal end portions 50 mounted to the wall 70 of FIG. 1 is employed to constitute the bottom floor 650 of the enclosure 640. The strips 20 are arranged in a layer-like structure, forming a flat bunch 730 covering the open bottom end 650 of the enclosure 640. Each of the distal end 80 of the deflectable strips 20 is shaped like a sharp tine 590 which touches or comes in contact with the inner wall surface 550 of the front wall 700 of the enclosure 640. The front wall 700 of the enclosure 640 is preferably made of translucent material to provide sufficient light into the enclosure.

The deflectable strips 20 where the fly 330 has landed deflect downwardly, the distal end 80 of the flat bunch 730 descends below the bottom edge 570 of the front wall 700 to reveal an opening 440 for the fly 330 to exit. The fly 330 departs from the deflected strips 20 into the chamber 10 of FIG. 1.

To discourage the fly 330 from attaching itself to the underside surface of deflectable strips 20. The underside surface 490 of each of the deflectable strips 20 in the lowest most layer of the flat bunch 730 exposing to the interior of the chamber 10 of FIG. 1 is coated with a thin layer of sticky material, grease, or preferably an oily material 740 to deter the flies from mounting onto the deflectable strips 20.

A plurality of spikes or tines 100 is mounted beneath the walls 670, 690, 700. Another set of tines 100 which are oriented horizontally is mounted to the underneath of the wall 700. The front wall 700 comprises a plurality of through openings or orifices 750, which allow the air and the scent coming from the insect attractant 120 to flow between the enclosure 640 and the chamber 10 of FIG. 1.

The deflectability of the deflectable strips 20 is chosen so that the opening 440 created by the deflected strips 20 is only big enough to allow the fly 330 to exit. The fly 330 would tend to squeeze itself into the chamber 10 of FIG. 1, when the fly 330 is attracted by the scent of the food attractant 120, air and light coming through the orifices 750. It is clear that the aperture 60 is well protected by the enclosure 640 and the deflectable strips 20 constituting the bottom floor of the enclosure 640. The aperture 60 and the distal end 80 of the flat bunch 730 are well hidden from flies and other insects trapped inside the chamber 10 of FIG. 1.

The deflectable strips 20 which constitute the bottom floor 650 of the enclosure 640 cooperate with the enclosure 640 to define a passageway 40 that starts with an entrance at the aperture 60. The passageway 40 is closed and terminates at the distal end 80 of the bunch 730. The deflectable strips 20 comprising the crawl path 420 bend downwardly to reveal an opening 440 below the bottom edge 570 of the front wall 700 when the fly 330 lands on the crawl path 420, allowing the fly 330 to exit eventually from the crawl path 420 into the chamber 10 of FIG. 1.

When the strips 20 are bent downwardly, it is clear that a gap is created between the distal end 480 of the deflected strips 20 and the inner surface 550 of the front wall 700. The gap may be sufficiently large to allow the fly 330 to squeeze itself out to the interior of the chamber 10 of FIG. 1. It is shown in this case that the exit to the interior of the chamber 10 is well hidden behind the front wall 700.

Figure 5:
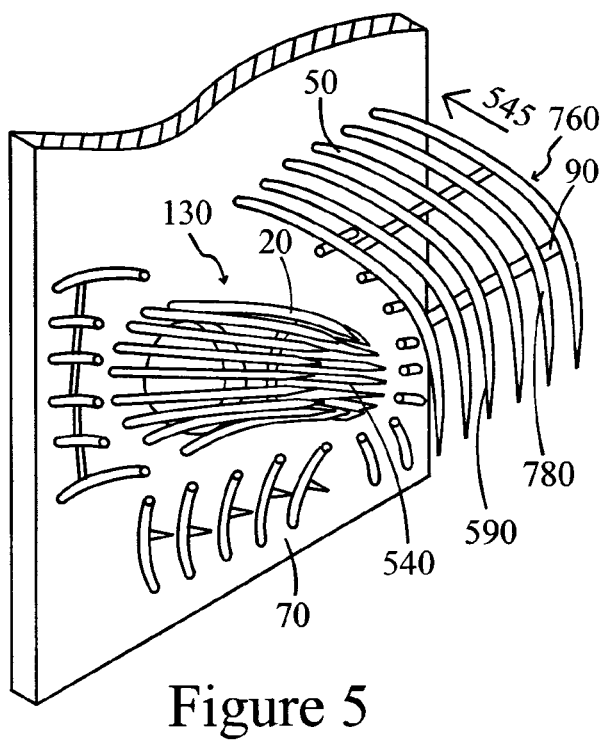
FIG. 5 is a simplified diagram of a fourth preferred configuration of the bunch comprising a plurality of deflectable strips.

Referring now to FIG. 5, a plurality of curved deflectable strips 760 is employed to encompass the exit opening 540 of the tapered bunch 130. The distal end portion 780 of the curved deflectable strips 20 is bent downwardly to cover, though not completely, the exit opening 540 of the tapered bunch 130. The curved deflectable strips 760 is displaced in FIG. 5 to show clearly the structure of the tapered bunch 130. The curved deflectable strips 760 are moved toward the wall 70 in a direction shown by the arrow 545 until the terminal end 50 of each of the curved deflectable strips 760 is mounted to the wall 70, and the distal end 780 of the curved deflectable strips 760 encompasses the exit opening 540.

The distal end 780 of each of the curved deflectable strips 760 is shaped like a sharp tine 590. The curved deflectable strips 760 is linked to each other by a plurality of short flexible strips 90. The short flexible strips 90 prevent flies from squeezing themselves through the curved deflectable strips 760.

Figure 6:
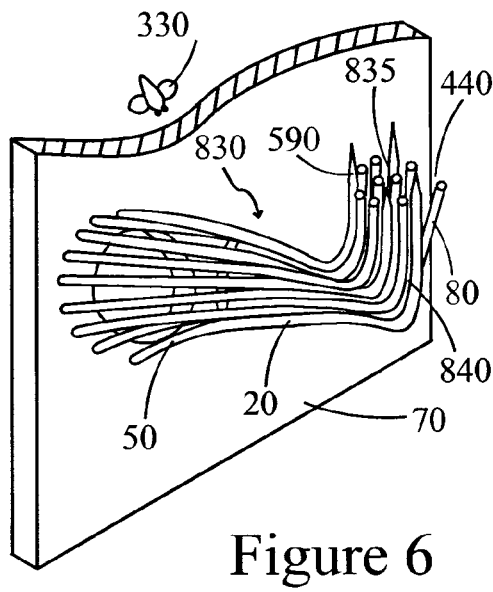
FIG. 6 is a simplified diagram of a fifth preferred configuration of the bunch comprising a plurality of deflectable strips.

Referring now to FIG. 6, the fifth preferred configuration of the bunch 30 having a bent end portion at the distal end thereof is employed for use in the chamber 10 in FIG. 1. A bending bunch 830 having a terminal end portion 50 terminating at the wall 70 of FIG. 1 comprises a plurality of deflectable strips 20. The distal end 80 portion of the bunch 830 is configured to bend upwardly from the substantially horizontal position to a vertical position. The distal end 80 of each of the deflectable strips 20 is oriented upwardly and aligned with each other to form a closed path 835 to thwart the flies from entering. Furthermore, some of the distal ends 80 of the deflectable strips 20 are shaped to have pointed ends, a tine-like structure 590 to discourage the flies from entering the bunch 830.

Some insects, for example, mosquitos, tend to fly upwardly. They may fly downwardly but they seldom dive downwardly. When the fly 330 moves upwardly through the strips 20 along the vertical columns 840 formed by the deflectable strips 20 near the distal end 80 of the bending bunch 830, the fly 330 tends to push the strips 20 aside, squeezing its way up into the chamber 10 of FIG. 1. The deflectable strips 20 deflect or swerve to the side to reveal an opening 440 into the chamber 10. The fly 330 at the distal end portion 80 of the bunch 830 is guided by the vertically oriented strips 20 toward the opening 440. The fly 330 departs from the bunch 830 upon exiting from the distal end 80 of the bunch 830. The deflected strips 20 deflect back and return to their un-disturbed configuration. The distal end portion 80 of the bunch 830 resumes its initial position which is closed to the flies trapped inside the chamber 10 of FIG. 1.

Figure 7:
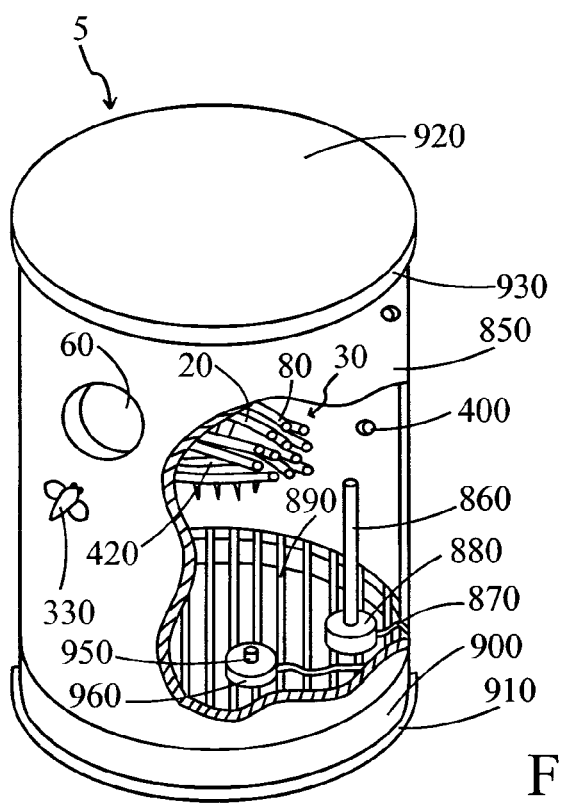
FIG. 7 is a simplified diagram of a second preferred embodiment showing a cylindrical chamber with a light bulb and an insect scent attractant.

Referring now to the second preferred embodiment of my invention shown in FIG. 7, wherein an insect trap 5 having a cylindrical housing 850 comprises a lighted tube 860 which emits attractive light, usually ultraviolet light, to lure the files into the housing 850. The lighted tube 860 is connected to a power source (not shown) via electrical wires 870. The lighted tube with its supporting structure 880 is rested on a base 890, which is made of an array of spaced-apart wires. The wires are spaced to provide sufficient clearance for the flies to drop through the openings to the bottom of a collection chamber 900, which is positioned immediately below the base 890. The bottom of the collection chamber 900 comprises a detachable cover 910 for easy removal of dead flies from the chamber 10. A detachable cover 920 is also provided to cover the top portion of the housing. The top cover 920 and the bottom cover 910 comprise skirts 930 extending from the rims of the covers to enclose the housing completely.

A scent-producing insect attractant 950 is placed on the supporting structure 960 to attract the flies. A fly 330 enters the housing 850 through the aperture 60 and lands on the crawl path 420. The deflectable strips 20 constituting the crawl path 420 inside the bunch 30 are deflected downwardly for the fly 330 to exit the bunch 30 into the housing 850.

The distal end portion 80 of the bunch 30 acts as a closure to the aperture 60 when the distal end portion 80 of the bunch 30 is closed to the flies trapped inside the interior of the housing 850. The distal end portion 80 of the bunch changes from a closed position to an open position when the fly 330 lands on the crawl path 420 inside the bunch 30. The end portion 80 of the bunch 30 returns from the open position to the closed position again when the fly 330 departs from the bunch 30.

Based on the description of the invention and its preferred modes of operation in sufficient detail as shown above, it will be obvious to those of normal skill in the art to make certain changes and variation in the specific elements of the disclosed embodiments without departing from the scope of the invention. It is clear that the foregoing disclosure is merely an illustration of the principles of the present invention. Numerous alternatives, modifications and additions, apparent to those skilled in the art, may be made without deviating from the spirit and broader aspects of this invention as defined in the appended claims.

The invention claimed is:

1. An insect trap for luring and trapping a flying insect therein, comprising:
  a) an aperture in a hollow chamber of said trap;
  b) a first set of a plurality of deflectable strips having terminal ends of said strips dispersed and terminated around said aperture for constituting a sufficiently long deflectable crawl path to lead from said aperture into the interior of said chamber;
  c) an enclosure, having a side opening mounted toward said aperture, comprising a collapsible bottom floor constituted by said crawl path and a means made of material impenetrable to said insect to form an enclosed passageway that closes at a distal end of said crawl path, and with said crawl path in direct proximity to the interior of said chamber; and
  d) an insect attractant to lure said insect; wherein said insect enters said aperture, said crawl path is deflected upon landing of said insect to reveal a small opening at the distal end of said crawl path, said insect crawls toward said distal end of said crawl path, the size of said opening increases by the continued crawl- ing of said insect, the distal end of said crawl path changes from an initial closed position upon the landing of said insect to an open position to allow said insect to enter said chamber and returns to said initial closed position upon the departure of said insect from said crawl path.

2. The trap of claim 1, wherein said trap includes an array of tines mounted outwardly from said enclosure.

3. The trap of claim 1, wherein said trap includes an oily material coated to the underside surfaces of said crawl path.

4. The trap of claim 1, wherein said trap includes a plurality of deflectable strips having a plurality of tines at the distal end thereof.

5. The trap of claim 1, wherein a distal end of said crawl path is bent into a vertical position to guide said insect to exit upwardly.

6. The trap of claim 1 including a slidable tray containing said insect attractant.

7. The trap of claim 1, wherein said trap includes a light tube emitting light to attract said insect.

8. The trap of claim 1, wherein said trap includes a hollow cartridge containing discrete segments of adhesive, sticky material.

9. The trap of claim 1, wherein said first set of deflectable strips is twisted to form said crawl path.

10. The trap of claim 1, wherein said means is made of a second set of deflectable strips interlinked together by a plurality of short flexible strips.

11. An insect trap for luring and trapping an insect therein, comprising:
  a) an aperture in a hollow chamber of said trap;
  b) a first set of a plurality of deflectable strips having terminal ends of said strips dispersed and terminated around said aperture for constituting a sufficiently long deflectable crawl path to lead from said aperture into the interior of said chamber;
  c) an enclosure, having a side opening mounted toward said aperture, comprising a collapsible bottom floor constituted by said crawl path and a means which comprises a second set of a plurality of deflectable strips linked together by a plurality of short flexible strips to form an enclosed passageway that closes at a distal end of said crawl path, and with said crawl path in direct proximity to the interior of said chamber; and
  d) an insect attractant to lure said insect; wherein said insect enters said aperture, said crawl path is deflected anddisjoint upon landing of said insect to reveal a small opening at the distal end of said crawl path, said insect crawls toward said distal end of said crawl path, the size of said opening increases by the continued crawling of said insect, the distal end of said crawl path changes from an initial closed position upon the landing of said insect to an open position to allow said insect to enter said chamber and returns to said initial closed position upon the departure of said insect from said crawl path.

12. The trap of claim 11, wherein said trap includes a light tube emitting light to attract said insect.

13. The trap of claim 11, wherein said trap includes an oily material coated to the underside surfaces of said crawl path.

14. The trap of claim 11, wherein end portions of said second set of deflectable strips are bent into a vertical position to guide said insect to exit upwardly.

15. The trap of claim 11, wherein said trap comprises a plurality of tines mounted outwardly from said enclosure.

16. An insect trap for luring and trapping a flying insect therein, comprising:
   a) an aperture in a hollow chamber of said trap;
   b) a plurality of deflectable strips having terminal ends of said strips dispersed and terminated around said aperture for constituting a crawl path to lead from said aperture into the interior of said chamber;
   c) an enclosure comprising an enclosed passageway with said crawl path that closes at a distal end of said crawl path; and
   d) an insect attractant to lure said insect;
      wherein said deflectable strips constituting said crawl path are twisted for said insect to crawl, said crawl path is deflected and disjoint from said enclosure upon landing of said insect to reveal a small opening at the distal end of said crawl path, said insect crawls toward said distal end of said crawl path, the size of said opening increases by the continued crawling of said insect, said deflectable strips constituting said crawl path change from an initial closed position with said enclosure upon the landing of said insect to an open position to allow said insect to enter said chamber, said deflectable strips return to said initial closed position with said enclosure upon the departure of said insect from said deflectable strips.

17. The trap of claim 16, wherein said trap includes an array of tines mounted outwardly from said enclosure.

18. The trap of claim 16, wherein said trap includes an oily material coated to the underside surfaces of said crawl path.

* * * * *